(12) United States Patent
Oggerino et al.

(10) Patent No.: US 8,606,939 B1
(45) Date of Patent: Dec. 10, 2013

(54) METHOD OF CONFIGURING AN ON-DEMAND SECURE CONNECTION BETWEEN A CONTROL SITE AND A CLIENT NETWORK

(75) Inventors: Christopher Paul Oggerino, Reno, NV (US); Michael Derek Airhart, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 1205 days.

(21) Appl. No.: 11/274,398

(22) Filed: Nov. 14, 2005

(51) Int. Cl.
*G06F 15/16* (2006.01)
*H04H 20/71* (2008.01)
*G06F 7/04* (2006.01)

(52) U.S. Cl.
USPC ............................ 709/229; 370/312; 726/6

(58) Field of Classification Search
USPC .................... 370/349, 255, 351; 709/229
See application file for complete search history.

(56) References Cited

U.S. PATENT DOCUMENTS

| | | | |
|---|---|---|---|
| 6,377,571 B1 * | 4/2002 | Tai .................. | 370/355 |
| 6,452,920 B1 * | 9/2002 | Comstock ............. | 370/349 |
| 6,662,224 B1 * | 12/2003 | Angwin et al. ........... | 709/224 |
| 6,678,828 B1 * | 1/2004 | Pham et al. ............. | 726/2 |
| 6,834,298 B1 * | 12/2004 | Singer et al. ........... | 709/220 |
| 7,002,927 B2 * | 2/2006 | Guruprasad ............ | 370/255 |
| 7,058,711 B2 | 6/2006 | Fitzgerald ............. | 709/224 |
| 7,085,808 B2 * | 8/2006 | Haverinen et al. ........ | 709/203 |
| 7,185,107 B1 * | 2/2007 | Cassar ................ | 709/239 |
| 7,360,087 B2 * | 4/2008 | Jorgensen et al. ........ | 713/168 |
| 7,440,452 B1 * | 10/2008 | Giniger et al. .......... | 370/389 |
| 7,558,846 B2 * | 7/2009 | Gu et al. .............. | 709/220 |
| 7,656,822 B1 * | 2/2010 | AbdelAziz et al. ....... | 370/255 |
| 2002/0029256 A1 * | 3/2002 | Zintel et al. ............ | 709/218 |
| 2003/0137971 A1 * | 7/2003 | Gibson et al. .......... | 370/351 |
| 2003/0177221 A1 * | 9/2003 | Ould-Brahim et al. ..... | 709/223 |
| 2004/0107342 A1 * | 6/2004 | Pham et al. ........... | 713/165 |
| 2005/0102369 A1 * | 5/2005 | Kim et al. ............. | 709/213 |
| 2006/0277275 A1 * | 12/2006 | Glaenzer ............. | 709/219 |
| 2007/0094691 A1 * | 4/2007 | Gazdzinski ............ | 725/62 |
| 2007/0112975 A1 * | 5/2007 | Cassar ................ | 709/239 |
| 2008/0162726 A1 * | 7/2008 | Hoover et al. .......... | 709/245 |

OTHER PUBLICATIONS

"ITU-T- Rec. Y.1310 (Mar. 2000) Transport of IP over ATM in public network : International Telecommuncaition Union ; Series Y: Global information infrastructure and Internet Protocol Aspects" Dated May 7, 2001.*
www.pptpclient.sourceforge.net, "News: MPPE in Linux 2.6.15," 19 pages total, www.pptpclient.sourceforge.net/#overview.

* cited by examiner

*Primary Examiner* — Krisna Lim
*Assistant Examiner* — Margishi Desai
(74) *Attorney, Agent, or Firm* — Edwards Wildman Palmer LLP; James M. Behmke; Stephen D. LeBarron

(57) ABSTRACT

A method of configuring an on-demand secure connection between a control site and a client network is described. The method involves establishing a first tunnel between the control site and the edge device of the client network. The method then involves automatically detecting a sub-network coupled to the edge device, and configuring the edge device to allow a second tunnel to be established within the first tunnel, where the second tunnel connects the control site to the detected sub-network.

23 Claims, 6 Drawing Sheets

Flowchart 400

Flowchart 600

METHOD OF CONFIGURING AN ON-DEMAND SECURE CONNECTION BETWEEN A CONTROL SITE AND A CLIENT NETWORK

BACKGROUND

1. Field of the Invention

The present invention relates to establishing a secure connection between computer networks, and more specifically to creating secure tunnels between networks that allow for core reachability of a client network.

2. Related Art

Computers have an ever-increasing role in business operations today. As corporations become more familiar with this technology, they are also becoming more sophisticated in how their computers are organized, serviced, and protected. For some of these needs, many companies turn to outside sources for complicated or time-consuming tasks, thereby reducing the need to have a large technical support staff on-site. Such support agreements between client businesses and support companies are becoming more common.

Presently, several options exist for remote administration and support of a computer network, each with advantages and disadvantages. At one end of the spectrum of support are tools like telnet and secure shell (SSH). These tools are very limited in terms of what can be accomplished, in large part because they are simple command-line interfaces. They are, however, fairly easy to use, and are, if properly configured, fairly secure as well.

At the other end of the spectrum are so-called managed services. In such an arrangement, a permanent tunnel links a support site with the client's network, allowing for immediate administration and support at all times. Tunneling, as known in the art, enables one network to send its data via another network's connections. In some implementations, tunneling works by encapsulating a network protocol within packets carried by the second network. However, many companies are not comfortable with having an always-open tunnel into their network, even when nothing is going wrong.

Relatively few offerings fall between these two extremes on the remote administration spectrum. One notable middle point exists, in virtual private networking. A VPN allows a support computer to access a client's network. Security issues aside, a major drawback to this approach is that the support computer is limited to tools located either on the support computer, or on the client's network. If the tool needed to fix the problem is not in either location, there is no easy way to access it, short of moving it to one or the other computer.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
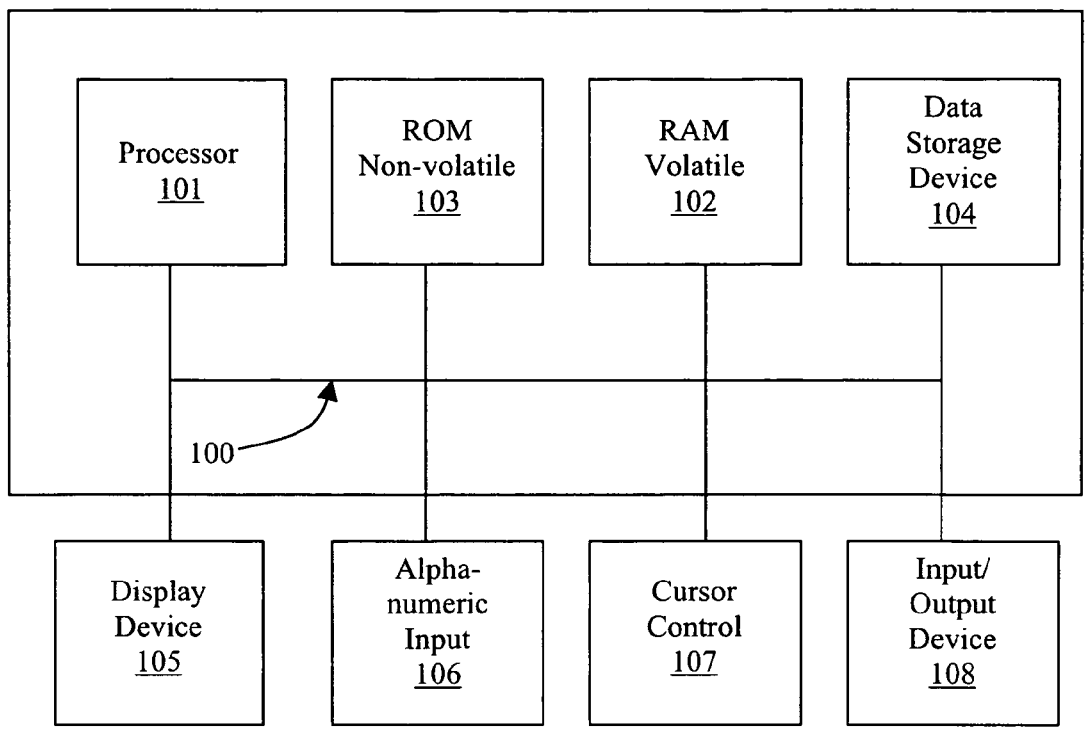
FIG. 1 is a block diagram of an exemplary computer system upon which embodiments of the present invention may be implemented.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Referring now to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1. Moreover, the present invention may be practiced on any system which can be configured to allow it, not just computer systems like computer system 112.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

Exemplary Computer Network

Figure 2:
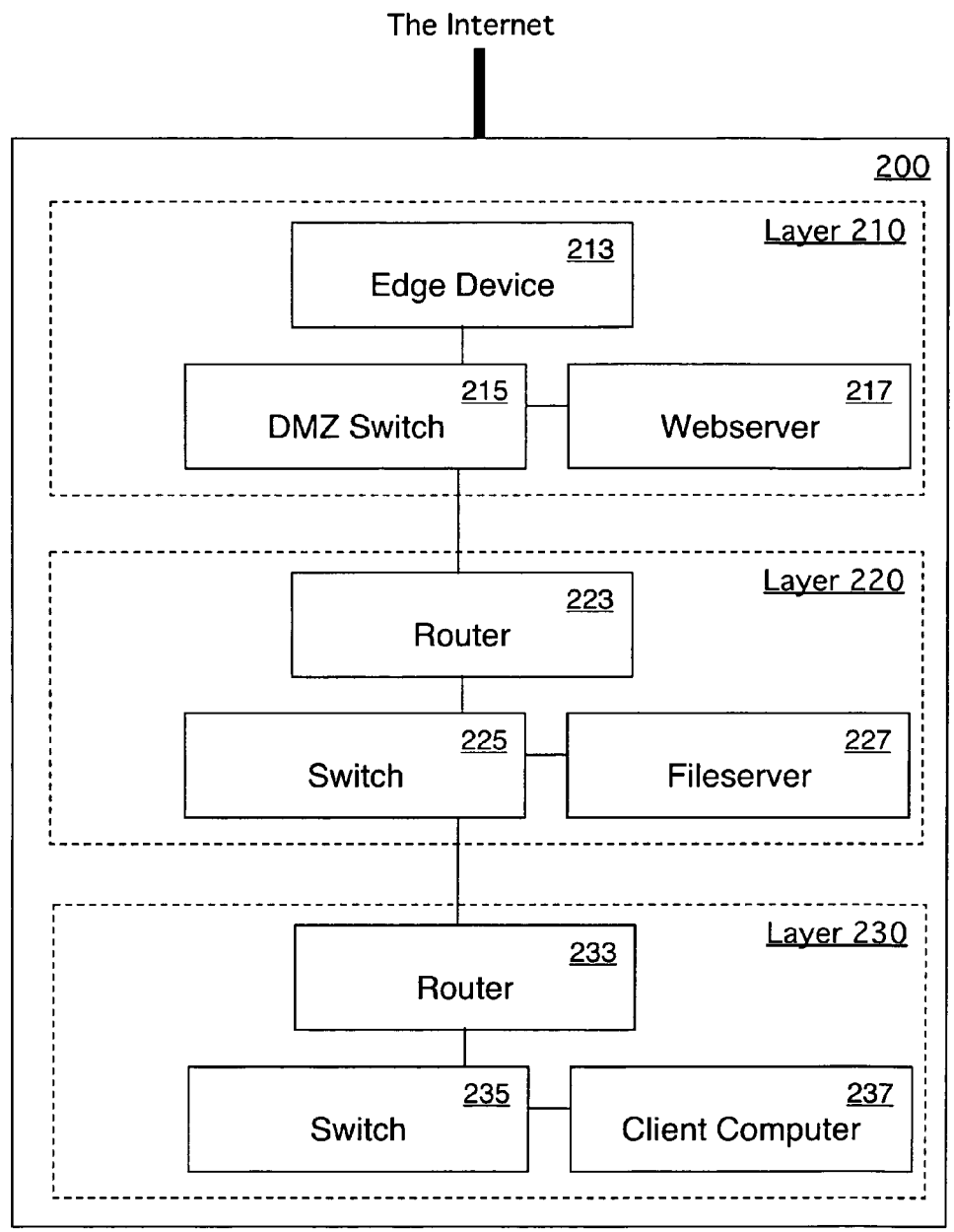
FIG. 2 is a block diagram of an exemplary client computer network upon which embodiments of the present invention may be implemented.

With reference now to FIG. 2, an exemplary client network 200 is depicted, upon which embodiments of the present invention may be implemented. Other network arrangements are similarly compatible with other embodiments of the present invention. Client network 200 is shown as being composed of three layers. The number of layers in client network 200 can vary in different embodiments. This layered approach to network structure is common in the art, as it provides progressive layers of security and accessibility, with the bottom-most layer, here layer 230, having the greatest levels of protection. Each layer can be considered as a sub-network within client network 200.

The upper-most first layer, layer 210, serves as the connection between client network 200 and, e.g., the Internet. Layer 210, in this embodiment, comprises edge device 213, e.g., a router, and switch 215. Edge device 213, in most embodiments, is configured to allow devices connected to client network 200 to access the Internet, while restricting the flow of information. In some embodiments, edge device 213 restricts access from the Internet to client network 200. In other embodiments, edge device 213 also restricts access to the Internet from various devices connected to client network 200. Switch 215, in this embodiment, is shown as a DMZ (demilitarized zone) switch. In this embodiment, edge device 213 is configured to allow access from the Internet to certain devices, e.g., webserver 217, connected to switch 215. Layer 210, in this embodiment, is shown as corresponding to the network address range 192.168.1.X; any device present in layer 210 would have an address drawn from this range; e.g., webserver 217 can have a network address of 192.168.1.17.

The second layer, layer 220, is similarly shown as comprising a router device, router 223, and a switch, switch 225. In some embodiments, router 223 would be a PIX (Private Internet Exchange) Firewall. In many embodiments, router 223 is configured to greatly restrict access from outside client network 200 to devices further down the network. Devices connected to switch 225, such as fileserver 227, only seldom, if ever, need to be accessed from outside the network. Layer 220, in this embodiment, is shown as corresponding to the network address range 192.168.2.X; any device present in layer 220 would have an address drawn from this range; e.g., fileserver 227 can have a network address of 192.168.2.27.

The third layer, layer 230, also is shown as comprising a router device, router 233, and a switch, switch 235. In this embodiment, layer 330 is the bottom-most layer of client network 200. In some embodiments, router 233 is configured to prevent any outside access to switch 235 and devices connected to the switch, e.g., client computer 237. Layer 230, in this embodiment, is shown as corresponding to the network address range 192.168.3.X; any device present in layer 230 would have an address drawn from this range; e.g., client computer 237 can have a network address of 192.168.3.37.

In the depicted embodiments, each sub-layer is depicted as having both a router and a switch. It is understood that configurations of sub-networks will vary across embodiments, or even within the same client network 200. Further, while client network 200 is here depicted as utilizing only routers to separate sub-networks, other embodiments utilize other devices. In many embodiments, devices compliant with the OSI (Open Systems Interconnection) multilayered communication model are utilized extensively. In some such embodiments, so-called "layer 3" devices are utilized to differentiate between sub-layers of client network 200. For example, routers 223 and 233, in the depicted embodiment, are layer 3 devices.

Method of Configuring On-Demand Secure Connections

Figure 3:
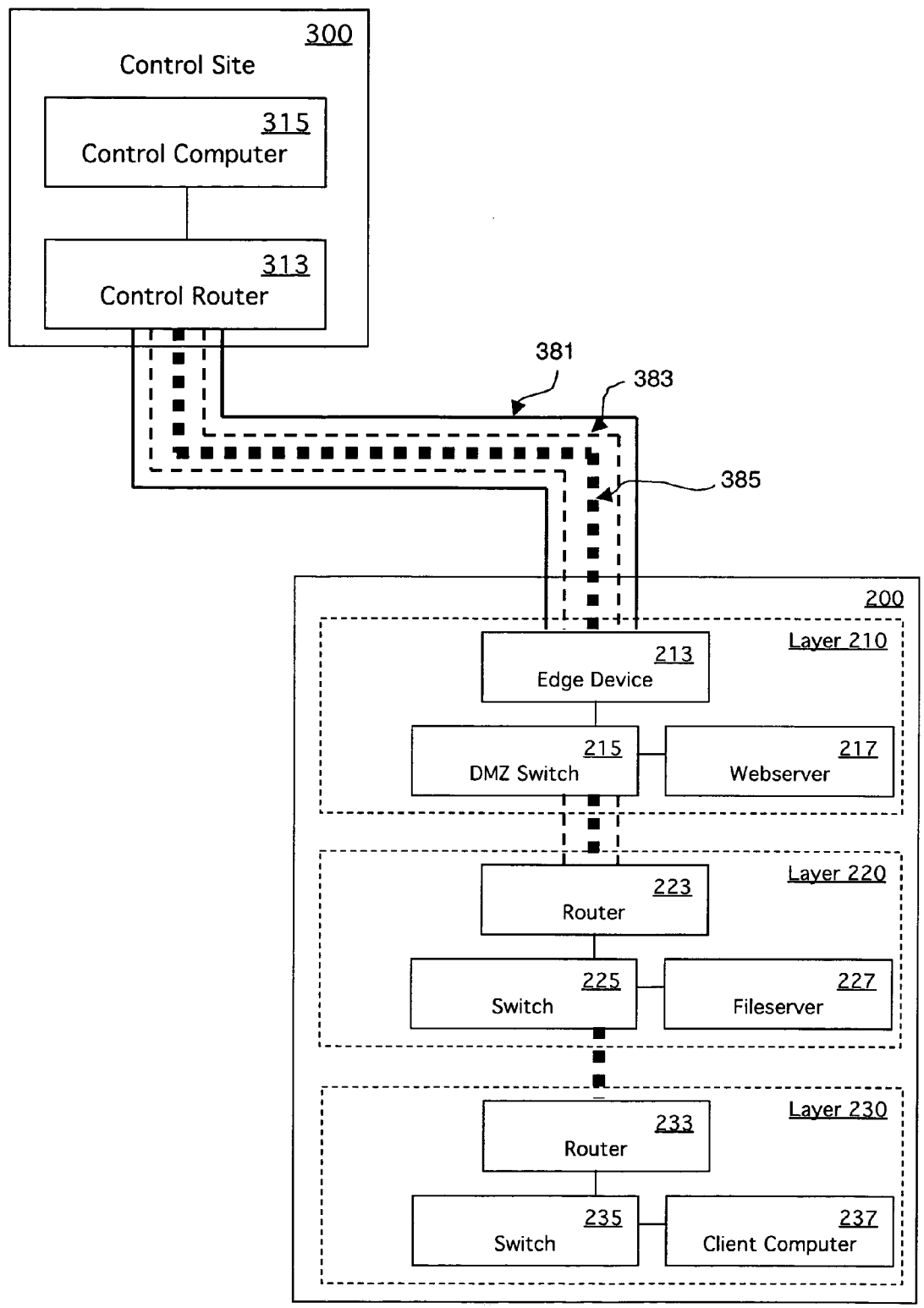
FIG. 3 is a block diagram of a control site communicating with a client network over nested tunnels, in accordance with one embodiment of the present invention.
Figure 4:
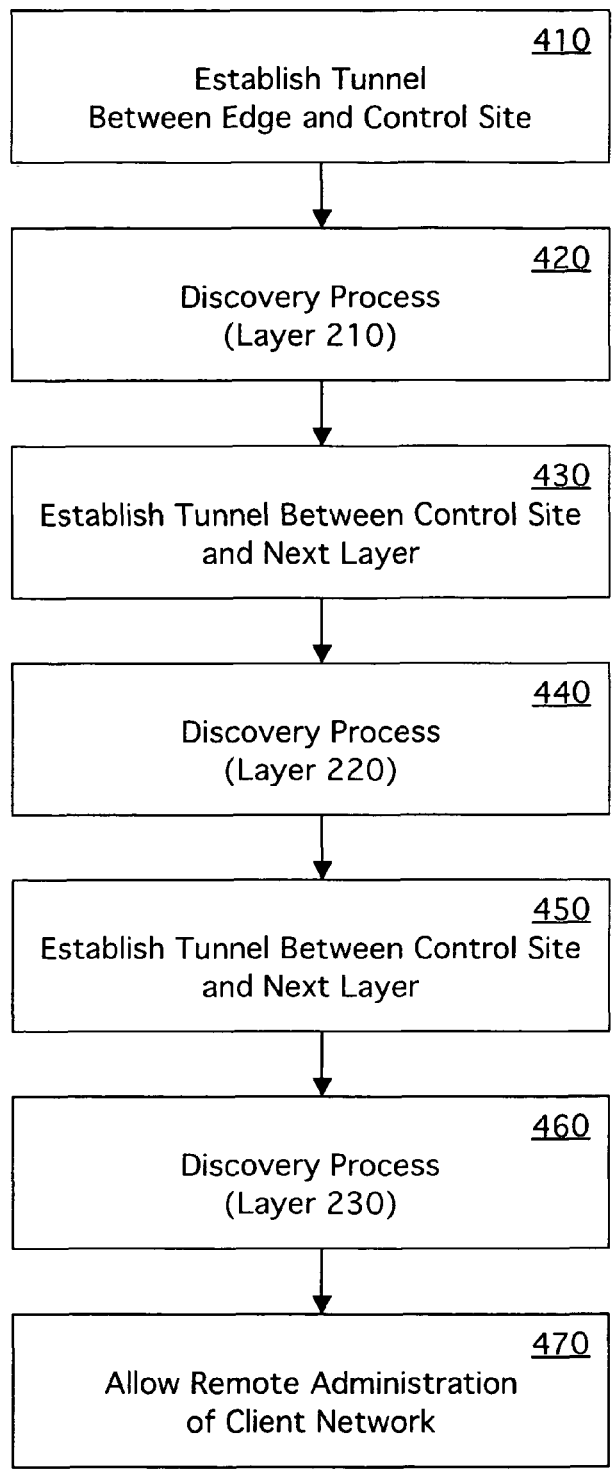
FIG. 4 is a flowchart of a method of establishing a secure connection between a control site and a client network on-demand.

With reference now to FIGS. 3 and 4, a system and a method for configuring an on-demand secure connection between a control site and a client network are described, in accordance with one embodiment of the present invention. FIG. 3 depicts a control site 300 in communication with client network 200. FIG. 4 shows a flowchart 400 of a method of configuring an on-demand secure connection between control site 300 and client network 200. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410 and FIG. 3, a tunnel 381 is established between control site 300 and edge device 213 of client network 200. In some embodiments, the creation of this first tunnel is automated, e.g., by executing configuration scripts on control computer 315. In some embodiments, in order to establish this tunnel, control computer 315 must be provided the IP address of edge device 213, as well as a user name and password. In several such embodiments, the account corresponding to the user name must have sufficient permissions so as to modify the configuration of edge device 213.

With reference now to step 420 and FIG. 3, control computer 315 performs a standard discovery process on layer 210 of client network 200, in order to determine what devices are connected to edge device 213. In this embodiment, this discovery process would detect switch 215, as well as devices connected to switch 215, such as webserver 217 and router 223, in layer 220 of client network 200.

In some embodiments, step 420 includes determining if edge device 213 is running the Cisco™ Discovery Protocol (CDP). CDP is a protocol that runs over Layer 2 (the data link layer) on all Cisco™ routers, bridges, access servers, and switches. CDP allows network management applications to discover devices that are neighbors of already known devices, in particular, neighbors running lower-layer, transparent protocols. With CDP, network management applications can learn the device type and the SNMP agent address of neighboring devices. If edge device 213 supports CDP, but is not currently running CDP, control computer 315 reconfigures edge device 213 to enable CDP.

In step 430, control computer 315 establishes tunnel 383 between control site 300 and router 223 of client network 200. Tunnel 383, as shown in this embodiment, is created inside tunnel 381. As with step 410, discussed above, in some embodiments control computer 315 needs to be provided with a user name and password, in order to access router 223.

In step 440, control computer 315 performs a discovery process on layer 220 of client network 200. As in step 420, above, all devices connected to router 223 and switch 225 can be detected. In the depicted embodiment, this discovery process detects switch 225, fileserver 227, and router 233. In some embodiments, control computer 315 also attempts to utilize CDP, as discussed above, to aid in this detection process.

In step 450, control computer 315 establishes tunnel 385 between control site 300 and router 233 of client network 200. Tunnel 385, as shown in this embodiment, is nested inside tunnels 383 and 381. As with step 410, discussed above, in some embodiments control computer 315 needs to be provided with a user name and password in order to configure router 233.

In step 460, control computer 315 performs a discovery process on layer 230 of client network 200. As in step 420, above, all devices connected to router 233 and switch 235 can be detected. In the depicted embodiment, this discovery process detects switch 235 and client computer 237. In some embodiments, control computer 315 also attempts to utilize CDP, as discussed above, to aid in this detection process.

In some embodiments, the user of control computer 315 is presented with the cumulative list of detected devices after every detection step. In such an embodiment, if the user knows how deep client network 200 is, further steps can be aborted, once the deepest level has been reached. This state is labeled full or core reachability, and describes a condition in which control site 300 has access to every device connected to client network 200. In the depicted embodiment, core reachability is attained after step 460, when control computer 315 has discovered every device in every layer of client network 200.

In other embodiments, if the user knows which device connected to client network 200 requires administration, once that device has been discovered, the process can be aborted. Similarly, if client network 200 includes several parallel layers, e.g., two layers at the same level as layer 230, if the user knows which layer the problematic device is part of, he can "steer" the tunneling process in order to avoid creating unnecessary connections between healthy sublayers and control site 300.

In some embodiments, this method is automated such that every detected layer of client network 200 is tunneled to and connected to control site 300, with the steps of tunneling and detection recursively executing, until core reachability of client network 200 is established. In one embodiment, this method requires ten tunnels to be nested, one inside the other, to access a client network 10 layers deep.

In step 470, in some embodiments, once core reachability of client network 200 has been established, control site 300 can be used to remotely administer any device connected to client network 200. Any remote administration tools or technical support tools known in the art and that can be used over a tunnel connection may be utilized in conjunction with embodiments of the present invention.

Figure 5:
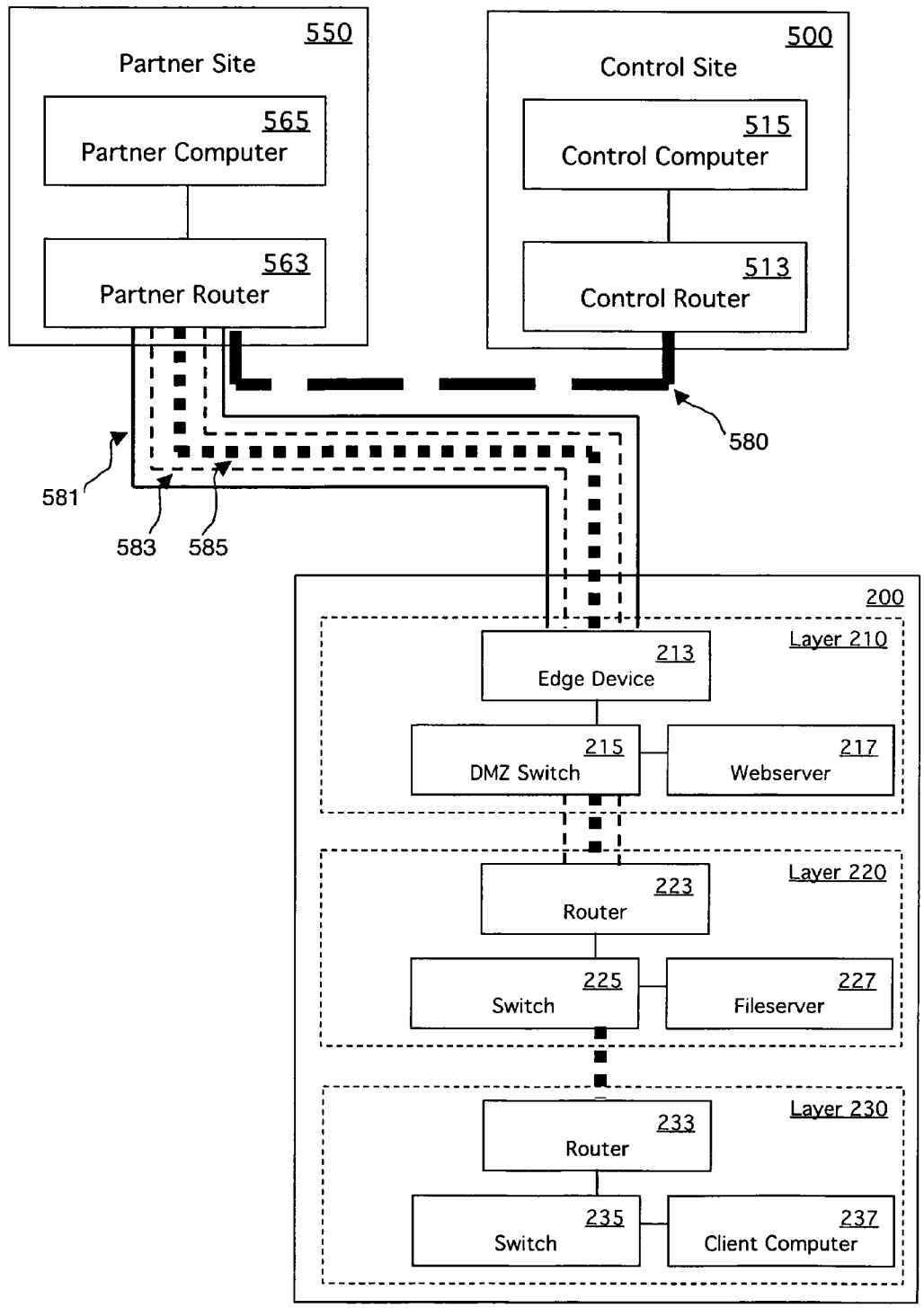
FIG. 5 is a block diagram of a control site establishing a secure connection between a partner site and a client network, in accordance with one embodiment of the present invention.
Figure 6:
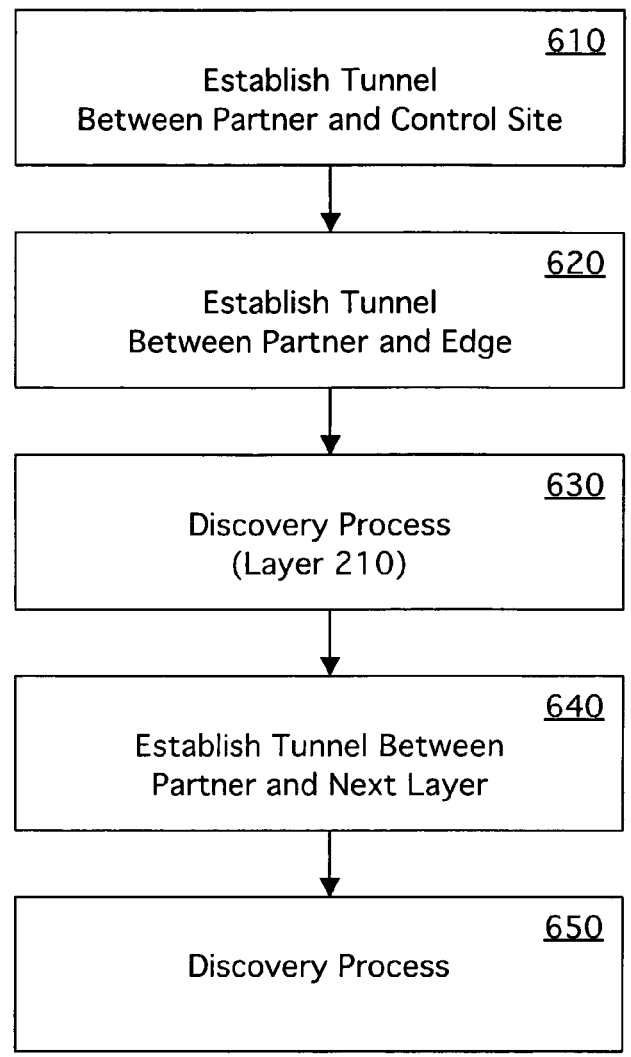
FIG. 6 is a flowchart of a method of utilizing a control site to establish a secure connection between a partner site and a client network on-demand.

Method of Configuring an on-Demand Connection Between a Partner Site and a Client Network With reference now to FIGS. 5 and 6, a system and a method for configuring an on-demand secure connection between a partner site and a client network are described, in accordance with one embodiment of the present invention. FIG. 5 depicts a control site 500 and a partner site 550 in communication with client network 200. FIG. 6 shows a flowchart 600 of a method of configuring an on-demand secure connection between partner site 550 and client network 200. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610 and FIG. 5, a secure tunnel 580 is established between control site 500 and partner router 563. In some embodiments, tunnel 580 is created in response to a request from partner site 550, e.g., a request made by accessing a web page and selecting an option to begin configuring a connection between partner site 550 and client network 200. Tunnel 580 ensures secure communication between control site 500 and partner site 550, and allow control computer 515 to configure partner router 563 as needed. In some embodiments, in order for control computer 515 to establish tunnel 580, control computer 515 needs to be provided with a user name and password for router 563.

With reference now to step 620 and FIG. 5, control computer 515 establishes tunnel 581 between partner site 550 and edge device 213 of client network 200. In some embodiments, in order to establish this tunnel, control computer 515 must be provided the IP address of edge device 213, as well as a user name and password. In several such embodiments, the account corresponding to the user name must have sufficient permissions so as to modify the configuration of edge device 213.

With reference now to step 630 and FIG. 5, control computer 515 performs a standard discovery process on layer 210 of client network 200, in order to determine what devices are connected to edge device 213. In this embodiment, this discovery process would detect switch 215, as well as devices connected to switch 215, such as webserver 217 and router 223, in layer 220 of client network 200. In some embodiments, step 630 includes utilization of CDP, as described above, to aid in the discovery process.

In step 640, control computer 515 establishes tunnel 583 between partner site 550 and router 223 of client network 200. Tunnel 583, as shown in this embodiment, is created inside tunnel 581. As with step 620, discussed above, in some embodiments control computer 515 needs to be provided with a user name and password, in order to access router 223.

In step 650, control computer 515 performs a discovery process on layer 220 of client network 200. As in step 630, above, all devices connected to router 223 and switch 225 can be detected. In the depicted embodiment, this discovery process detects switch 225, fileserver 227, and router 233. In some embodiments, control computer 515 also attempts to utilize CDP, as discussed above, to aid in this detection process.

In some embodiments, the user of partner computer 565 is presented with the cumulative list of detected devices after every detection step. In such an embodiment, if the user knows how deep client network 200 is, further steps can be aborted, once the deepest level has been reached. This state is labeled full or core reachability, and describes a condition in which control site 300 has access to every device connected to client network 200.

In other embodiments, if the user knows which device connected to client network 200 requires administration, once that device has been discovered, the process can be aborted. Similarly, if client network 200 includes several parallel layers, e.g., two layers at the same level as layer 230, if the user knows which layer the problematic device is part of, he can "steer" the tunneling process in order to avoid creating unnecessary connections between healthy sublayers and partner site 550.

In some embodiments, the tunneling and discovery processes described in steps 640 and 650 continue recursively, such that every detected layer of client network 200 is tunneled to in turn and connected to partner site 550, until core reachability of client network 200 is established. In one embodiment, this method requires ten tunnels to be nested, one inside the other, to access a client network ten layers deep.

Embodiments of the present invention that implement this method of configuring on-demand secure connections between a partner site and a control site have several advantages. First, by establishing the secure tunnels through control site 500, any partner site 550 and partner computer 565 can establish secure connections on demand. In such an embodiment, no special software needs to be installed by a user of partner site 550 before taking advantage of the present invention, nor is there any concern regarding maintaining current versions for security, as control site 500 is the only operating implementation; an update or patch applied to control site 500 immediately benefits all partner sites 550. Additionally, partner site 550 can take advantage of tools and software stored on control computer 500, as well as tools already present at partner site 550, in performing tasks on client network 200. As such, proprietary software that might be too expensive to purchase for use on partner site 550 could still be utilized, e.g., in a pay-for-access arrangement, in working on client network 200.

Router Configurations

With reference to the tables that follow, exemplary configuration files for the various routers depicted in FIG. 5 are provided, in accordance with one embodiment of the present invention. These configurations are understood to be exemplary only; routers manufactured by different companies, and often different models of router with a common manufacturer, will require different syntax or instructions in order to implement the present invention.

TABLE 1

| CONTROL ROUTER |
| --- |
| hostname ControlRtr |
| ! |
| ip subnet-zero |
| ! |
| interface Loopback0 |
| ip address 1.1.1.1 255.255.255.255 |
| ! |
| interface Tunnel0 |
| ip unnumbered FastEthernet0/0 |
| keepalive 10 3 |
| tunnel source FastEthernet0/0 |
| tunnel destination 10.10.10.1 |
| ! |
| interface FastEthernet0/0 |
| ip address 10.10.10.3 255.255.255.0 |
| duplex auto |
| speed auto |
| ! |
| interface Serial0/0 |
| no ip address |
| shutdown |
| no fair-queue |
| ! |
| interface FastEthernet0/1 |
| ip address 10.253.253.1 255.255.255.0 |
| duplex auto |
| speed auto |
| ! |
| interface Serial0/1 |
| no ip address |
| shutdown |
| ! |
| ip classless |
| ip route 0.0.0.0 0.0.0.0 10.10.10.1 |

Table 1 depicts a configuration file for control router 513, on accordance with one embodiment of the present invention. The portions of this configuration file indicated in bold correspond to instructions to create tunnel 580 between control site 500 and partner site 550. In this embodiment, in order to establish tunnel 580, the above configuration, or one having a similar effect, is implemented on router 513 by control computer 515.

TABLE 2

| PARTNER ROUTER |
| --- |
| hostname 2611xm1_PartnerSite |
| ip subnet-zero |
| ! |
| interface Tunnel0 |
|   ip unnumbered FastEthernet0/0 |
|   keepalive 10 3 |
|   tunnel source FastEthernet0/0 |
|   tunnel destination 10.10.10.3 |
| ! |
| interface Tunnel1 |
|   ip unnumbered FastEthernet0/0 |
|   keepalive 10 3 |
|   tunnel source FastEthernet0/0 |
|   tunnel destination 10.10.10.2 |
| ! |
| *interface Tunnel2* |
|   *description GREEN Tunnel* |
|   *ip unnumbered Loopback2* |
|   *keepalive 10 3* |
|   *tunnel source Loopback2* |
|   *tunnel destination 192.168.1.200* |
| ! |
| *interface Tunnel3* |
|   *description YELLOW Tunnel* |
|   *ip unnumbered Loopback3* |
|   *keepalive 10 3* |

TABLE 2-continued

| PARTNER ROUTER |
|---|
| *tunnel source Loopback3* |
| *tunnel destination 192.168.2.200* |
| ! |
| interface Loopback2 |
|   ip address 10.12.12.1 255.255.255.0 |
| ! |
| *interface Loopback3* |
|   *ip address 10.13.13.1 255.255.255.0* |
| ! |
| interface FastEthernet0/0 |
|   ip address 10.10.10.1 255.255.255.0 |
|   speed auto |
|   half-duplex |
|   no mop enabled |
| ! |
| interface FastEthernet0/1 |
|   ip address 10.254.254.1 255.255.255.0 |
|   speed auto |
|   half-duplex |
|   no mop enabled |
| ! |
| ip classless |
| ip route 1.1.1.1 255.255.255.255 Tunnel0 |
| ip route 10.253.253.0 255.255.255.0 Tunnel0 |
| <u>ip route 192.168.1.0 255.255.255.0 Tunnel1</u> |
| *ip route 192.168.2.0 255.255.255.0 Tunnel2* |
| *ip route 192.168.3.0 255.255.255.0 Tunnel3* |

Table 2 depicts a configuration file for partner site router 563, in accordance with one embodiment of the present invention. In some embodiments, control computer 515 remotely configures partner router 563 using this configuration, or one having a similar effect.

The portions of the configuration file indicated in bold text, and corresponding to Tunnel0, are implemented by control computer 515 to create tunnel 580 between control site 500 and partner site 550. The portions of the configuration file indicated by underlined text, and corresponding to Tunnel1, are implemented by control computer 515 to create tunnel 581, between partner site 550 and edge device 213 of client network 200. The portions of the configuration file indicated by italicized text, and relating to Tunnel2, are implemented by control computer 515 to create tunnel 583, between partner site 550 and router 223 of client network 200. The portions of the configuration file indicated by underlined, italicized text, and relating to Tunnel3, are implemented by control computer 515 to create tunnel 585, between partner site 550 and router 233 of client network 200.

In some embodiments, the above configuration is recursively and dynamically implemented. For example, with reference to FIG. 5, control computer 515 first configures partner router 563 to establish tunnel 580 (bold text). Once control computer 515 is provided with the IP address of client network 200, control computer 515 configures partner router 563 to establish tunnel 581 (underlined text). Following the discovery process detailed above with respect to step 630, control computer 515 configures partner router 563 to establish tunnel 583 (italicized text). Following the discovery process detailed above with respect to step 650, control computer 515 configures partner router 563 to established tunnel 585 (underlined, italicized text). In this manner, such embodiments are enabled to recursively configure partner router 563 as often as is necessary, in order to establish nested tunnels and achieve full reachability of client network 200.

TABLE 3

| EDGE DEVICE |
|---|
| hostname 2611xm2_CustomerEdge |
| ! |
| ! |
| interface Tunnel1 |
|   description RED tunnel |
|   ip unnumbered FastEthernet0/0 |
|   keepalive 10 3 |
|   tunnel source FastEthernet0/0 |
|   tunnel destination 10.10.10.1 |
| ! |
| interface FastEthernet0/0 |
|   ip address 10.10.10.2 255.255.255.0 |
|   speed auto |
|   half-duplex |
|   no mop enabled |
| ! |
| interface FastEthernet0/1 |
|   ip address 192.168.1.1 255.255.255.0 |
|   speed auto |
|   half-duplex |
|   no mop enabled |
| ! |
| ip classless |
| ip route 1.1.1.1 255.255.255.255 Tunnel1 |
| ip route 10.12.12.0 255.255.255.0 Tunnel1 |
| ip route 10.254.254.0 255.255.255.0 Tunnel1 |
| ip route 10.253.253.0 255.255.255.0 Tunnel1 |
| ip route 192.168.2.0 255.255.255.0 192.168.1.200 |
| ip route 192.168.3.0 255.255.255.0 192.168.1.200 |

Table 3 depicts a configuration file for edge device 213 of client network 200, in accordance with one embodiment of the present invention. In some embodiments, control computer 515 remotely configures edge device 213 using this configuration, or one having a similar effect. The portions of the text in table 3 indicated in bold, relating to Tunnel1, correspond to instructions to allow tunnel 581 to be established between partner site 550 and edge device 213, thereby allowing access to layer 210 of client network 200.

TABLE 4

| ROUTER 223 |
|---|
| hostname 2611xm3-CustInside |
| ! |
| ip subnet-zero |
| ! |
| interface Tunnel2 |
|   description GREEN Tunnel |
|   ip unnumbered FastEthernet0/0 |
|   keepalive 10 3 |
|   tunnel source FastEthernet0/0 |
|   tunnel destination 10.12.12.1 |
| ! |
| interface FastEthernet0/0 |
|   ip address 192.168.1.200 255.255.255.0 |
|   speed auto |
|   half-duplex |
|   no mop enabled |
| ! |
| interface FastEthernet0/1 |
|   ip address 192.168.2.1 255.255.255.0 |
|   speed auto |
|   half-duplex |
|   no mop enabled |
| ! |
| ip classless |
| ip route 0.0.0.0 0.0.0.0 192.168.1.1 |
| ip route 10.13.13.0 255.255.255.0 Tunnel2 |
| ip route 10.254.254.0 255.255.255.0 Tunnel2 |
| ip route 10.253.253.0 255.255.255.0 Tunnel2 |
| ip route 192.168.3.0 255.255.255.0 192.168.2.200 |

Table 4 depicts a configuration file for router 223 of client network 200, in accordance with one embodiment of the present invention. In some embodiments, control computer 515 remotely configures router 223 using this configuration, or one having a similar effect. The portions of the text in table 4 indicated in bold, relating to Tunnel2, correspond to instructions to allow tunnel 583 to be established between partner site 550 and router 223, thereby allowing access to layer 220 of client network 200.

TABLE 5

ROUTER 233 hostname 2611xm4-Cust2ndLevel
!
ip subnet-zero
!
interface Tunnel3
 description YELLOW Tunnel
 ip unnumbered FastEthernet0/0
 keepalive 10 3
 tunnel source FastEthernet0/0
 tunnel destination 10.13.13.1
!
interface FastEthernet0/0
 ip address 192.168.2.200 255.255.255.0
 speed auto
 half-duplex
 no mop enabled
!
interface FastEthernet0/1
 ip address 192.168.3.1 255.255.255.0
 speed auto
 half-duplex
 no mop enabled
!
ip classless
ip route 0.0.0.0 0.0.0.0 192.168.2.1
ip route 10.254.254.0 255.255.255.0 Tunnel3
ip route 10.253.253.0 255.255.255.0 Tunnel3

Table 5 depicts a configuration file for router 233 of client network 200, in accordance with one embodiment of the present invention. In some embodiments, control computer 515 remotely configures router 233 using this configuration, or one having a similar effect. The portions of the text in table 5 indicated in bold, relating to Tunnel3, correspond to instructions to allow tunnel 585 to be established between partner site 550 and router 233, thereby allowing access to layer 230 of client network 200.

Embodiments of the present invention described above thus relate method and systems for configuring an on-demand secure connection between a client network and another network. While the present invention has been described in particular embodiments, it should be appreciated that the present invention should not be construed as limited by such embodiments, but rather construed according to the below claims.

What is claimed is:

1. A method of configuring an on-demand secure connection between a control site and a client network, comprising:
    establishing a partner tunnel from said control site to a partner site, wherein said partner tunnel terminates at said partner site;
    prompting the establishment of a primary tunnel from said partner site to an edge device of said client network with the control site via the partner tunnel, wherein the client network includes multiple sub-networks located within corresponding sub-layers of said client network, and wherein the primary tunnel is configured to couple the partner site with the client network; and
    prompting the recursive establishment of one or more nested tunnels from said partner site through one or more sub-layers of said client network, wherein each of said nested tunnels is established inside of the primary tunnel and any nested tunnel previously established for upper sub-layers of said client network, each nested tunnel extending out of a previous tunnel and into the next layer at an edge device of a next sub-layer of the client network, wherein said recursive establishment comprises:
        conducting a discovery process in one or more sub-layers of said client network via the primary tunnel to ascertain a presence of at least one device in a corresponding lower sub-layer of said client network connected to an upper sub-layer of said client network, and
        configuring the at least one device discovered in said corresponding lower sub-layer with the control site via the partner tunnel and the primary tunnel to establish a nested tunnel within said primary tunnel, said primary tunnel terminating at the edge device and said nested tunnel extending through the edge device and terminating at the at least one device in the lower sub-layer to couple said partner site with lower sub-layer of said client network.

2. The method of claim 1, wherein said recursive establishment further comprises:
    conducting the discovery process in a first sub-layer of said client network coupled to said edge device via the primary tunnel to discover at least a first device located in the first sub-layer of said client network coupled to the edge device and to discover at least a second device in a second lower level sub-layer of said client network connected to the first sub-layer of said client network connected through the first device in the first sub-layer of said client network; and
    configuring the second device discovered in said second sub-layer of said client network with the control site via the partner tunnel and the first tunnel to establish a second tunnel nested within said first tunnel, said first tunnel terminating at the edge device and said second tunnel extending through the edge device and the first device in the first sub-layer of said client network and terminating at the second device in the second sub-layer of said client network coupling said partner site with said second sub-layer of said client network;
    configuring said control site to perform network administration on said first sub-layer of said client network through said second tunnel.

3. The method of claim 2, further comprising:
    automatically conducting a second discovery process in the second sub-layer of said client network to discover at least a third device in a third sub-layer of said client network connected to the second sub-layer of said client network by a discovered device in the second sub-layer of said client network.

4. The method of claim 3, further comprising:
    configuring said third device within the third sub-layer of said client network to establish a third tunnel nested within said second tunnel, said third tunnel passing through the edge device, through said first device in the first sub-layer of said client network, through said second device, and through said discovered device in said second-sub-layer of said client network and connecting said partner site and said third device in said third sub-layer of said client network.

5. The method of claim 1, wherein the recursively establishment is configured to allow said control site to establish a core reachability at a deepest layer of said client network.

6. The method of claim 1, further comprising: allowing said control site to perform a system maintenance task on said client network.

7. The method of claim 1, further comprising:
allowing said control site to provide technical support for a device coupled to said sub-layers of said client network.

8. A method of establishing an on-demand secure connection between a control site and a client network, comprising:
establishing a first tunnel from said control site to an uppermost layer of said client network, wherein the client network has multiple sub-network sub-layers each located at progressively lower sub-network sub-layers of the client network and each of the sub-network sub-layers have edge devices that restrict Internet access to the progressively lower sub sub-network sub-layers;
conducting a discovery process through the first tunnel to discover first level devices in the upper-most layer of said client network and to discover a second edge device in a second sub-network sub-layer within the upper-most layer of the client network coupled to one of the first level devices discovered in the upper-most layer;
establishing a second tunnel from said control site through the first tunnel and through the upper-most layer of said client network to the second edge device in the second sub-network sub-layer, the second tunnel extending out of the first tunnel and through the upper-most layer at an edge device of the upper-most layer; and
recursively establishing a plurality of nested tunnels from said control site through the plurality of the sub-network sub-layers of said client network, each of said plurality of nested tunnels established and nested inside of the tunnel previously established for an upper sub-network sub-layer, for accessing consecutively deeper sub-network sub-layers of said client network, wherein a user name and password are required by each of the edge devices at each of the different sub-network sub-layers in order to establish each of the nested tunnels, each nested tunnel extending out of a previous tunnel and into the next layer at an edge device of a next sub-layer of the client network.

9. The method of claim 8, wherein said recursively establishing nested tunnels continues until said control site has achieved full reachability of said client network.

10. The method of claim 8, wherein said recursively establishing nested tunnels continues until access to a designed device, coupled to one of said plurality of sub-layers, is achieved.

11. The method of claim 8, further comprising: allowing said control site to remotely administer a device coupled to one of said plurality of sub-layers.

12. The method of claim 8, further comprising:
remotely discovering devices coupled with one of said plurality of sub-layers of said client network using a discovery protocol.

13. The method of claim 12, wherein said remotely discovering further comprise discovering through the nested tunnels all devices coupled to each of said plurality of sub-layers of said client network and automatically generating a cumulative list identifying a depth of the client network and identifying the devices in every sub-layer of the client network.

14. The method of claim 13, further comprising:
allowing said control site to access any of said devices coupled to each of said plurality of sub-layers.

15. A method of utilizing a control device to create a secure connection between a partner device and a client network comprising:
configuring said partner device with a first tunnel configuration using said control device, in order to establish a first tunnel between said partner device and said control device;
configuring both said partner device and a first level device in a top level of said client network with a second tunnel configuration using said control device to establish a second tunnel between said partner device and the first level device in the top level of said client network; and
prompting a recursive establishment of at least one third tunnel from said partner device through at least one lower sub-level of said client network, wherein said third tunnel is nested inside of the second tunnel established within a top level of said client network, wherein said recursive establishment includes,
performing a discovery operation within the top level of the client network with the control device to detect a presence of the lower sub-level of said client network, and
configuring the partner device and a corresponding device discovered in the lower sub-level using said control device to establish the third tunnel between said partner site and the device corresponding device discovered in the lower sub-level of said client network, the third tunnel established within said second tunnel and extending out of the second tunnel and through the top level of said client network and terminating at the corresponding device in the lower sub-level to couple said partner site with lower sub-level of said client network.

16. The method of claim 15, wherein the recursive establishment
is configured to allow said control device to establish a core reachability at a deepest level of said client network.

17. The method of claim 15, wherein configuring said partner device and said control site to establish said first tunnel is performed in response to a web request issued by said partner site.

18. A computer-usable storage memory device having computer-readable program code embedded therein for causing a computer system to perform operations comprising:
establishing a partner tunnel configured to terminate at the computer system;
establishing a tunnel between the computer system and a first device in a first level of a client network in response to a configuration file received through the partner tunnel, wherein the client network includes multiple sub-networks located within corresponding sub-layers of the client network; and
recursively establishing of one or more nested tunnels from the computer system to one or more sub-networks of the client network, wherein each of the nested tunnels is established inside of the tunnel and any nested tunnel previously established to upper sub-networks of the client network, each nested tunnel extending out of a previous tunnel and into the next layer at an edge device of a next sub-layer of the client network, wherein the recursively establishing comprises:
discovering a presence of an edge device in a corresponding lower sub-network
of the client network through the tunnel and any previously established nested tunnels, wherein the edge device is coupled to the first level of the client network, and establishing another nested tunnel between the control device and the edge device in the corresponding lower sub-network of the client network, wherein the another nested tunnel is established inside the tunnel and any previously established nested tunnels.

19. A system for configuring an on-demand secure connection between a partner device and a client network, comprising:
a control device configured to establish a partner tunnel from said control device to said partner device, wherein said partner tunnel terminates at said partner device, wherein the control device is configured to add a first tunnel configuration file into an edge device of said client network via the partner tunnel, the first tunnel configuration file is configured to prompt an establishment of a first tunnel from said partner device to the edge device of said client network, wherein the control device is configured to recursively establish a second tunnel nested within the first tunnel via the partner tunnel by automatically conducting a discovery process in a first sub-network of the client network to discover first level devices coupled to said edge device and to discover a second level device in a second sub-network of the client network coupled to one of the first level devices, and adding a second tunnel configuration file to the discovered second level device, wherein the second tunnel configuration file is configured to prompt the second level device to establish a second tunnel nested within said first tunnel, said second tunnel coupling said partner device with said second sub-network the second tunnel extending out of the first tunnel and into the first sub-network at the edge device of the first sub-network.

20. The system of claim 19, further comprising: remote administration tools configured to allow said control device to perform network administration on said first sub-network through said second tunnel.

21. The system of claim 19, wherein said control device is configured to recursively establish a third tunnel nested within the first tunnel and the second via the partner tunnel.

22. The system of claim 21, wherein said control device is configured to conduct a discovery process in a second sub-network of the client network to discover second level devices coupled to said second level device and to discover a third level device in a third sub-network of the client network coupled to one of the second level devices.

23. The system of claim 22, wherein said control device is configured to add a third tunnel configuration file to the discovered third level device, wherein the third tunnel configuration file is configured to prompt the third level device to establish a third tunnel nested within said first tunnel and said second tunnel, said third tunnel coupling said partner device with said third sub-network.

* * * * *